(12) United States Patent   (10) Patent No.: US 6,662,774 B1
Toll                        (45) Date of Patent: Dec. 16, 2003

(54) ROTARY INTERNAL COMBUSTION ENGINE

(76) Inventor: Martin S. Toll, 78421 Desert Willow Rd., Palm Desert, CA (US) 92211

( * ) Notice: Subject to any disclaimer, the term of this patent is extended or adjusted under 35 U.S.C. 154(b) by 0 days.

(21) Appl. No.: 10/358,749

(22) Filed: Feb. 5, 2003

(51) Int. Cl.⁷ .................................................. F02B 53/04
(52) U.S. Cl. ...................................... 123/236; 123/237
(58) Field of Search ............................... 123/236, 237; 418/210

(56) References Cited

U.S. PATENT DOCUMENTS

| 944,362 | A | | 12/1909 | Hathaway | |
|---|---|---|---|---|---|
| 1,255,865 | A | | 2/1918 | Doane | |
| 1,256,996 | A | | 2/1918 | George | |
| 1,440,451 | A | * | 1/1923 | Ford | 123/237 |
| 1,649,091 | A | * | 11/1927 | Zimmer | 123/236 |
| 1,687,511 | A | | 10/1928 | Powell | |
| 1,792,026 | A | | 2/1931 | Nichols | |
| 1,810,082 | A | | 6/1931 | Marvin | |
| 1,864,406 | A | * | 6/1932 | Christ | 123/236 |
| 1,970,004 | A | * | 8/1934 | Friedell | 123/236 |
| 2,040,036 | A | * | 5/1936 | Weeks | 123/236 |
| 2,198,817 | A | | 4/1940 | Heins | |
| 2,435,476 | A | | 2/1948 | Summers | |
| 3,487,816 | A | | 1/1970 | Wild et al. | |
| 3,644,069 | A | | 2/1972 | Stewart | |
| 3,820,515 | A | | 6/1974 | Knisch | |
| 3,951,109 | A | | 4/1976 | Chappellier | |
| 4,072,132 | A | | 2/1978 | Lindros | |
| 4,086,881 | A | | 5/1978 | Rutten | |
| 4,154,208 | A | | 5/1979 | Kunieda et al. | |
| 4,572,121 | A | * | 2/1986 | Chang | 123/236 |
| 4,791,899 | A | | 12/1988 | Bodine | |
| 5,302,096 | A | | 4/1994 | Cavalleri | |
| 5,423,297 | A | | 6/1995 | Roberts | |
| 2002/0076346 | A1 | | 6/2002 | Tomoiu | |

* cited by examiner

Primary Examiner—Thomas Denion
Assistant Examiner—Thai-Ba Trieu

(57) ABSTRACT

A rotary internal combustion engine is disclosed that includes a housing defining a cavity with a central axis, and the cavity of the housing is divided into three compartments. The first compartment forms a suction chamber, and the third compartment forms a combustion chamber. A drive shaft extends through the cavity, a first rotor in the first compartment is fixedly mounted on the drive shaft, a first vane is mounted on the first rotor, a second rotor in the third compartment is fixedly mounted on the drive shaft, and a second vane is mounted in the second rotor. The second compartment is positioned between the first and second compartments and holds compressed air after leaving the first chamber and before entering the second chamber.

15 Claims, 9 Drawing Sheets

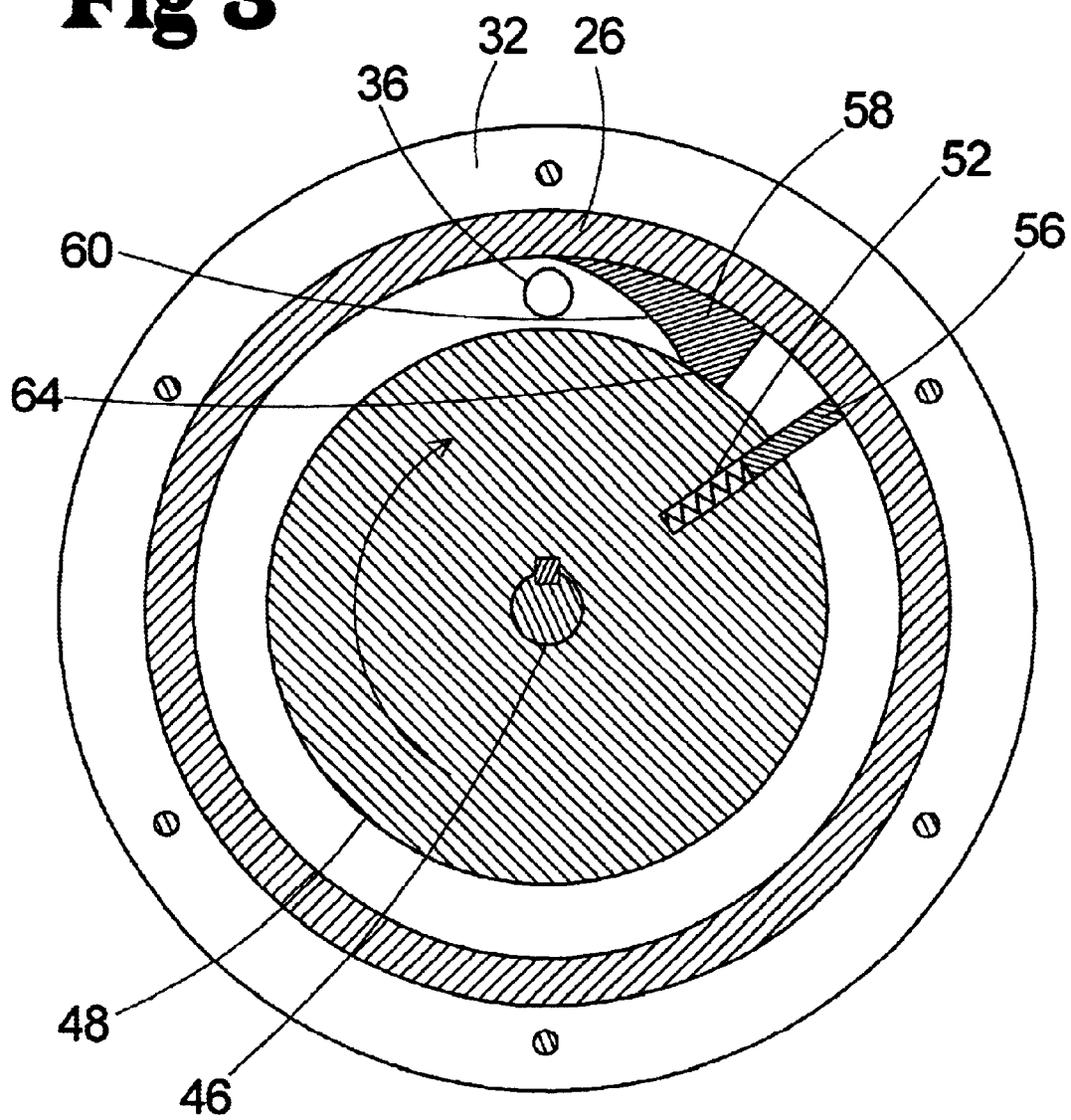

ROTARY INTERNAL COMBUSTION ENGINE

BACKGROUND OF THE INVENTION

1. Field of the Invention

The present invention relates to internal combustion engines, and more particularly pertains to a new rotary internal combustion engine.

2. Description of the Prior Art

Various rotary engine structures have been proposed in the prior art, and a common trait of the proposed engines is that the same rotor member is employed to induct or suck air into the operative chamber of the engine and to also convert the energy of the burning and expanding gases into rotational energy. Some proposals have involved blowing or partially compressing the intake air prior to moving the air into the combustion chamber, but it is believed that the degree of compression has been relatively limited and thus the amount of air moving into the combustion chamber or chambers is close to what would normally be pulled in by the movement of the rotor structure in the combustion chamber without the initial pressurization.

The supply of a significant and sufficient amount of compressed air to the combustion chamber of a rotary engine is believed to enhance the efficiency of the engine as the rotation of the rotor in the combustion chamber is not as taxed by having to pull the air into the chamber or by having to compress the charge of air once the air has been moved into the combustion chamber.

It is therefore believed that there is a need for a rotary engine design that is able to make available to the combustion chamber a significant amount of compressed air so that the rotor of the compression chamber is not required to pull the charge air into the chamber and is not required to compress the charge air once in the chamber.

SUMMARY OF THE INVENTION

In view of the foregoing disadvantages inherent in the known types of rotary engines now present in the prior art, the present invention provides a new rotary internal combustion engine construction with an enhanced and more efficient induction system for moving air into the engine and delivering the air to the combustion chamber.

To attain this, the present invention generally comprises a housing defining a cavity with a central axis, and the cavity of the housing is divided into three compartments. The first compartment forms a suction chamber, and the third compartment forms a combustion chamber. A drive shaft extends through the cavity, a first rotor in the first compartment is fixedly mounted on the drive shaft, a first vane is mounted on the first rotor, a second rotor in the third compartment is fixedly mounted on the drive shaft, and a second vane is mounted in the second rotor. The second compartment is positioned between the first and third compartments and holds compressed air after leaving the first chamber and before entering the second chamber.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 3 is a schematic cross sectional view of the present invention taken in a lateral plane lying along the line 3—3 in FIG. 1 showing the intake and compression compartment of the rotary engine.

DESCRIPTION OF PREFERRED EMBODIMENTS

Figure 1:
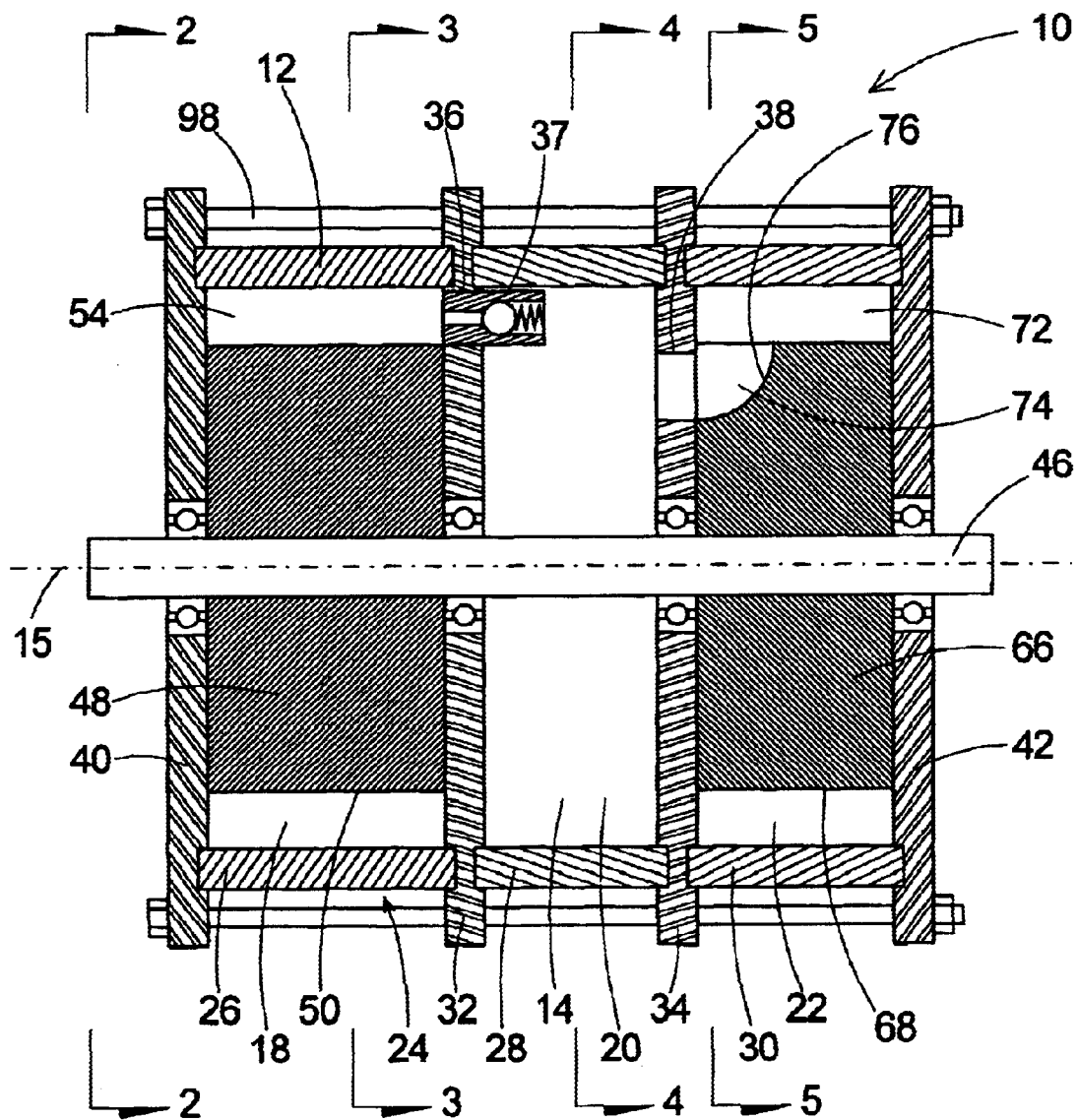
FIG. 1 is a schematic side cross sectional view taken along a longitudinal plane of the rotary engine of the present invention.
Figure 2:
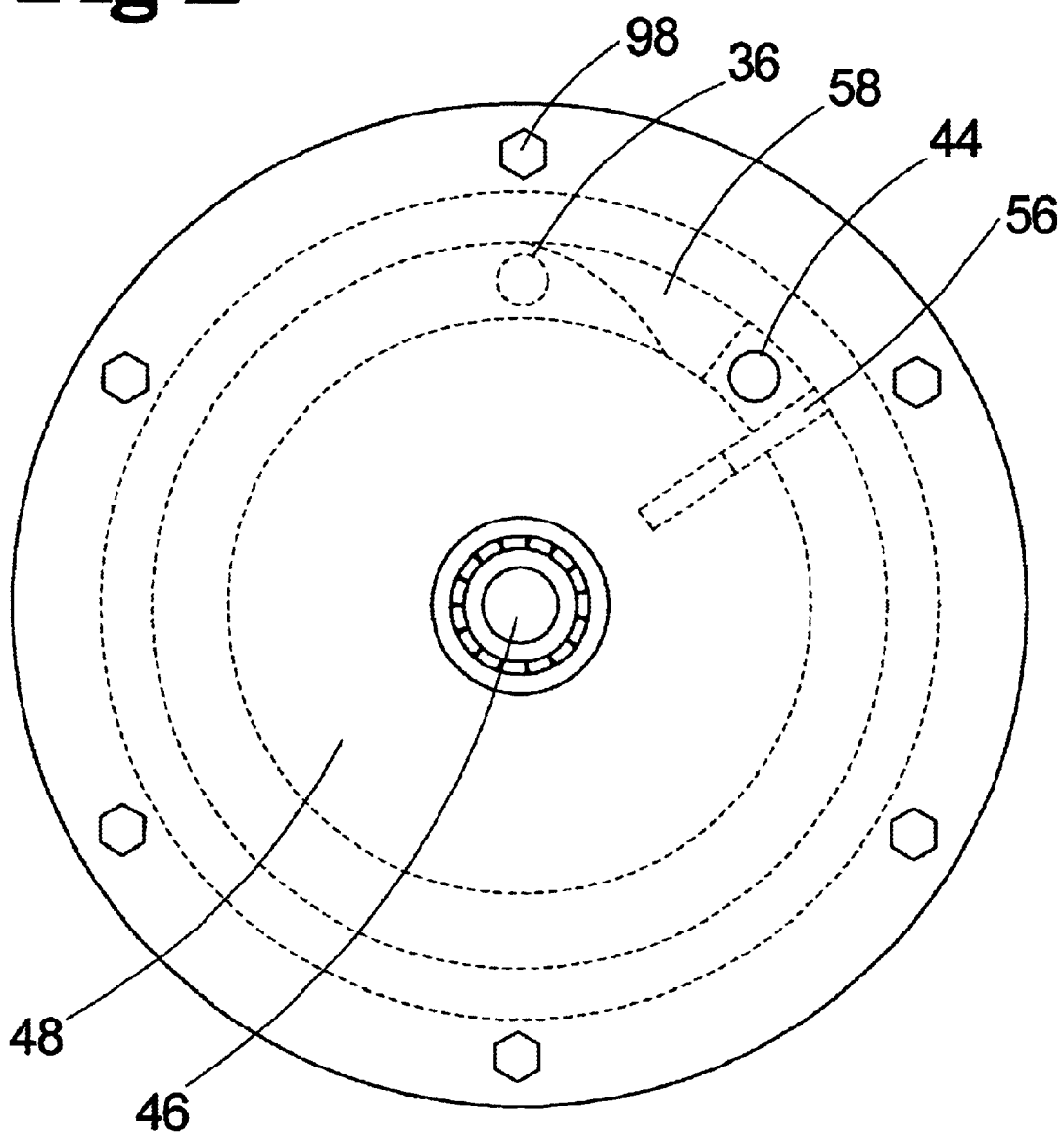
FIG. 2 is a schematic end view of the rotary engine from the perspective of line 2—2 of FIG. 1.
Figure 4A:
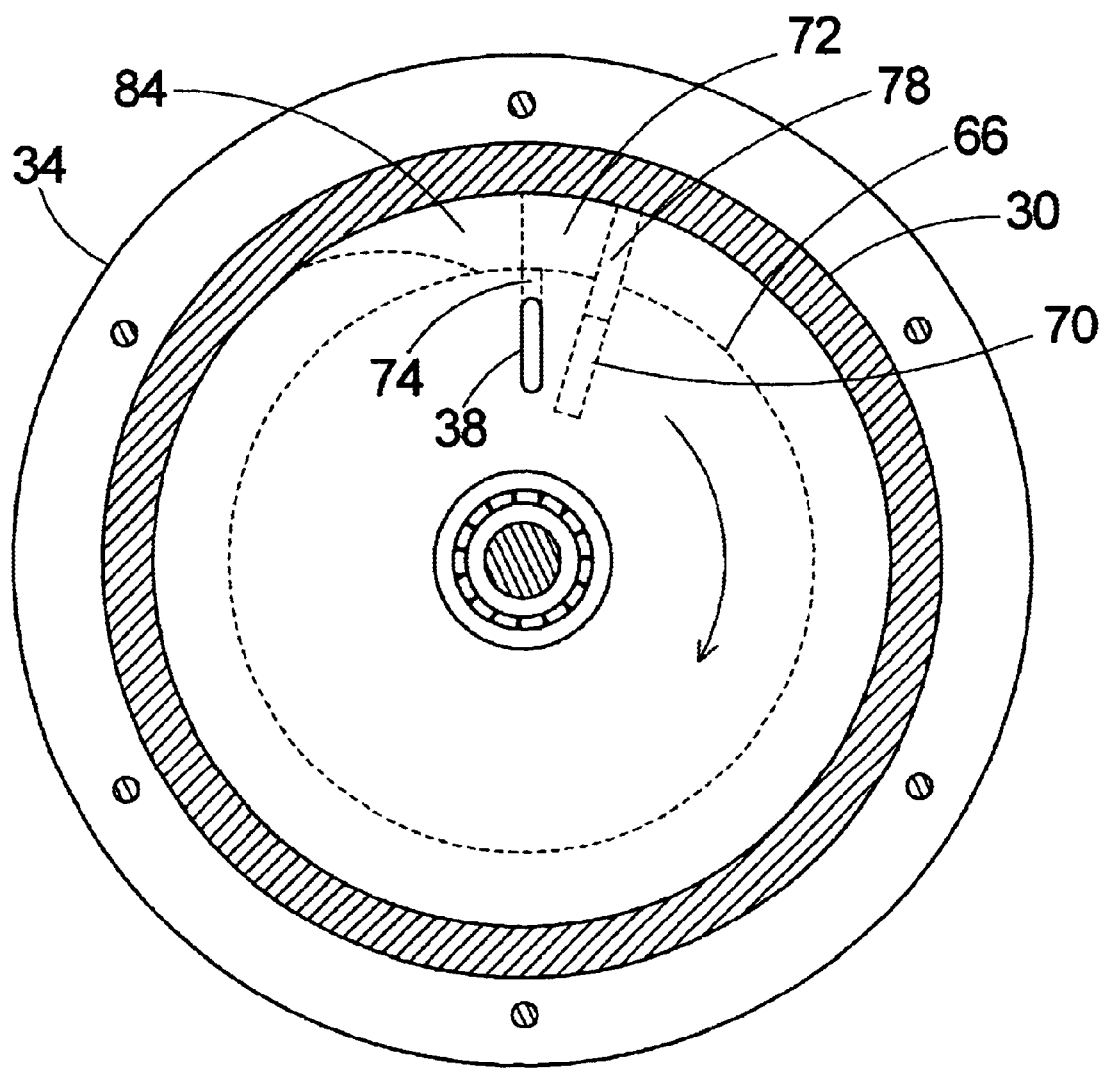
FIG. 4A is a schematic cross sectional view of the present invention taken in a lateral plane lying along line 4—4 in FIG. 1 in the compressed air holding compartment.
Figure 4B:
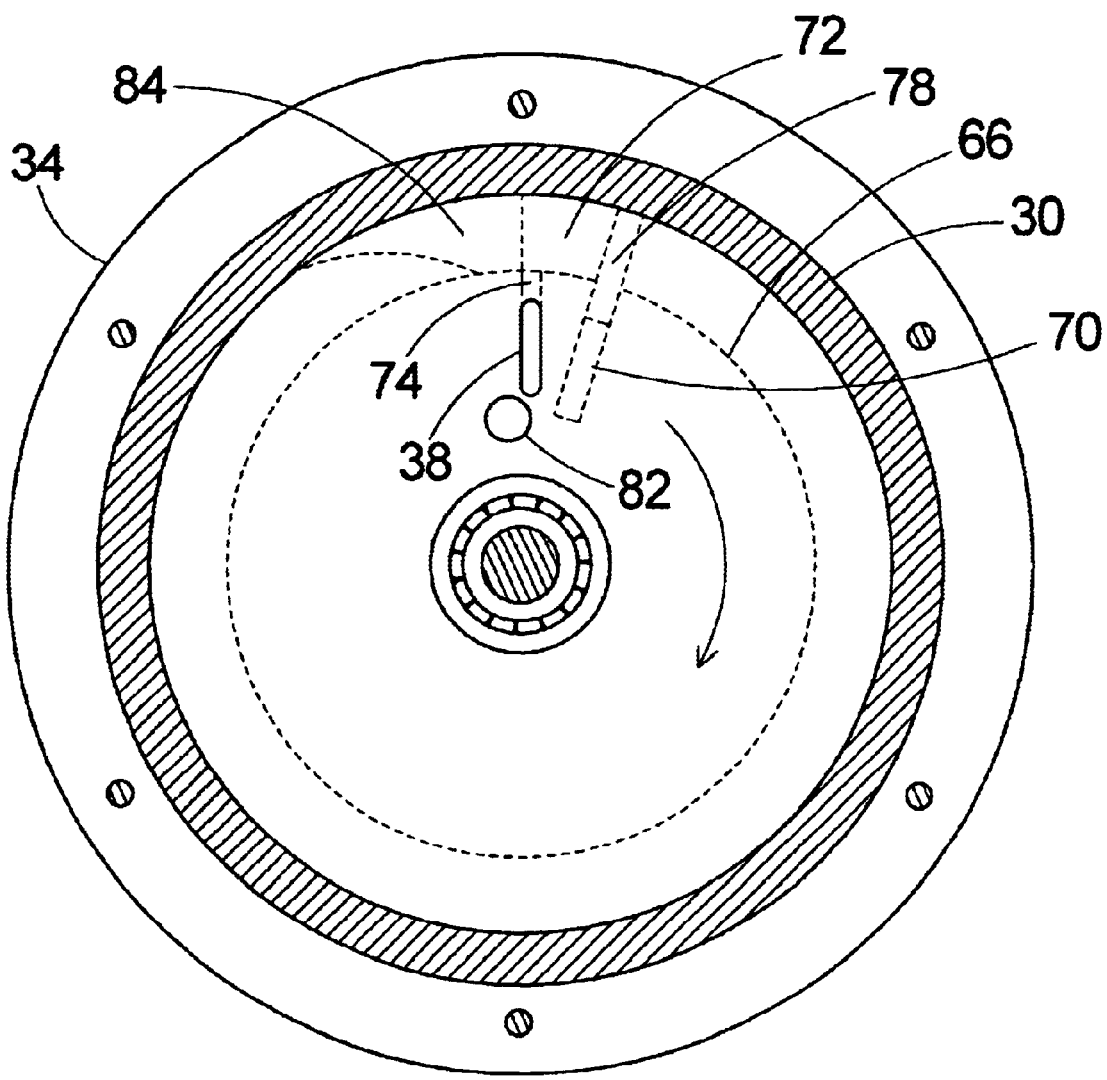
FIG. 4B is a schematic cross sectional view of an optional variation of the present invention taken in a lateral plane lying along line 4—4 in FIG. 1 showing the compressed air holding compartment.
Figure 5:
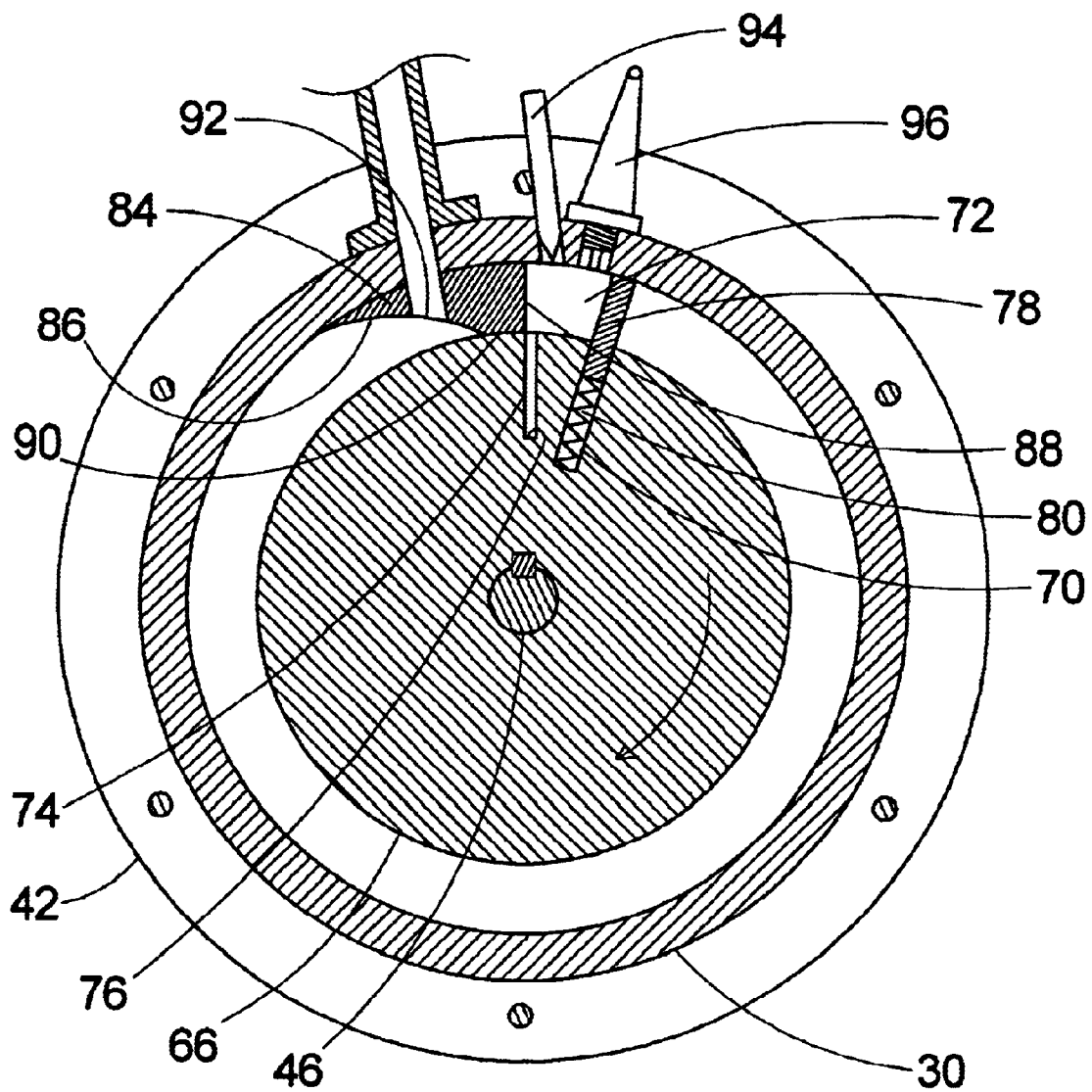
FIG. 5 is a schematic cross sectional view of the present invention taken in a lateral plane lying along the line 5—5 in FIG. 1 showing the combustion compartment of the rotary engine.

With reference now to the drawings, and in particular to FIGS. 1 through 8 thereof, a new rotary internal combustion engine embodying the principles and concepts of the present invention and generally designated by the reference numeral 10 will be described.

As best illustrated in FIGS. 1 through 8, the rotary internal combustion engine 10 of the invention generally comprises a three stage, four cycle rotary engine which includes a housing 12 that defines a cavity 14. The cavity 14 has a central axis 15 that extends longitudinally through the cavity. The cavity 14 defines a plurality of compartments, and the plurality of compartments generally comprises a first compartment 18, a second compartment 20, and a third compartment 22, with each of the compartments being arranged along the central axis 15 of the cavity 14.

The housing 12 includes a perimeter wall assembly 24 that defines a perimeter of the cavity formed by the housing. The perimeter wall assembly 24 may comprise at least one substantially annular wall, and in one embodiment of the invention, the perimeter wall assembly comprises three annular walls. A first one 26 of the annular walls comprises a first compartment perimeter wall surrounding the first compartment, a second one 28 of the annular walls comprises a second compartment perimeter wall surrounding the second compartment, and a third one 30 of the annular walls comprising a third compartment perimeter wall surrounding the third compartment. The housing 12 may also include a plurality of intermediate walls that divide the cavity 14 into the compartments. The plurality of intermediate walls may include a first intermediate wall 32 that is positioned between the first 18 and second 20 compartments, and a second intermediate wall 34 that is positioned between the second 20 and third 22 compartments.

The housing 12 includes a first passage 36 for permitting air to move from the first compartment 18 to the second compartment 20, and in one embodiment of the invention the first passage extends through the first intermediate wall 32. A means for permitting air movement from the first compartment 18 to the second compartment 20, while preventing air movement from the second compartment to the first compartment, may be provided at the first passage 36. This means may comprise a check valve 37 of any suitable construction, including those check valves employing spring-biased balls and reeds.

The housing 12 has a second passage 38 that permits air to move from the second compartment 20 to the third compartment 22. In one embodiment of the invention, the second passage 38 extends through the second intermediate wall 34, and may be elongate and extend along a radially axis extending from the central axis of the cavity.

The housing 12 includes a plurality of end walls defining ends of the cavity 14 in the housing. The plurality of end walls may include a first end wall 40 positioned opposite the first intermediate wall 32 with the first compartment 18 located therebetween, and a second end wall 42 positioned opposite the second intermediate wall 20 with the third compartment 22 located therebetween.

An intake opening 44 is formed on the housing 12 for permitting air to enter the first compartment 18 from the atmosphere, optionally through an induction system of conduits, filters and/or air flow sensors (not shown). In one embodiment of the invention, the intake opening 44 extends through the first end wall 40, although other positions of the intake opening 44 may also be suitable.

A drive shaft 46 may extend in the cavity 14 and be positioned along the central axis 15 of the cavity. The drive shaft 46 may extend through the first 32 and second 34 intermediate walls and also the first 40 and second 42 end walls. A bearing may mount the drive shaft 46 in each of the walls 32, 34, 40, 42.

The invention also includes a first rotor 48 positioned in the first compartment 18 of the cavity 14. The first rotor 48 may be fixedly mounted on the drive shaft 46 such that the first rotor rotates with the drive shaft, and a key may be positioned in keyways formed in the first rotor and the drive shaft to accomplish this relationship. The first rotor 48 has an outer perimeter 50, which may be substantially circular in shape. A first slot 52 may be formed in the first rotor 48 that extends radially inward from the outer perimeter 50 towards a center of the first rotor. A first chamber 54 is defined between the outer perimeter 50 of the first rotor 48 and the perimeter wall assembly 24, and may be substantially annular in shape. The first chamber 54 forms a suction/compression chamber in which a charge of air is drawn or sucked into the first chamber and compressed before moving into the second compartment 20. The second compartment 20 functions as a holding chamber in which the compressed charge of air passing out of the first chamber 54 is temporarily held.

A first vane 56 is mounted in the first slot 52 of the first rotor 48. The first vane 56 is movable in a radial direction with respect to the first rotor 48 such that the first vane 56 is extendable beyond the outer perimeter 50 of the first rotor 48 toward the perimeter wall assembly 24 and into the first chamber 54. Biasing means may be provided for biasing the first vane 56 in a radially outward direction in the first slot 52 for biasing the first vane against the perimeter wall assembly. The biasing means may comprise a spring positioned in the first slot 52, and as an option, up to four or more springs may be employed for biasing the first vane outwardly. In one embodiment of the invention, the first vane 56 may be formed of a relatively lightweight material, such as a ceramic material, to increase the speed at which the first vane moves outwardly toward the perimeter wall assembly 24.

A first cam member 58 is providing for camming or moving the first vane 56 with respect to the first rotor. The first cam member 58 is stationary with respect to the housing. The first cam member 58 is located between the first rotor 48 and the perimeter wall assembly 24 in the first chamber 54, and is also located between the first end wall 40 and the first intermediate wall 32. The first cam member 58 has a first camming surface 60 and a first release surface 62 over which the first vane 56 in the rotating first rotor 48 passes. The first camming surface 58 acts to press the first vane 56 radially inward when the first rotor 48 is rotated and the first vane contacts and slides across the first camming surface. The first camming surface 60 may have an arcuate contour so that the first vane 56 encounters a concave surface. The first release surface 62 may be oriented substantially in a plane that radiates from the central axis of the cavity, although other surface orientations are possible.

The intake opening 44 in the first end wall 40 is preferably located adjacent to the first release surface 62 of the first cam member such that rotation of the first vane 56 away from the first release surface, which creates an expanding space between the first vane and the first cam member, causes air to be sucked into the first chamber behind the moving vane. The first passage 36 in the first intermediate wall 32 is preferably located adjacent to the first camming surface 60 of the first cam member 58 such that rotation of the first vane 56 toward the first cam member pushes air in the first chamber 54 in front of the moving vane is pushed out of the first chamber into the second compartment under pressure.

The first cam member 58 may also include a first sealing surface 64 that is positioned adjacent to the outer perimeter 50 of the first rotor 48 for restricting air flow between the first sealing surface and the outer perimeter of the first rotor. Thus, the first cam member 58 blocks movement of the charge of air in the first chamber 54 to thereby force the air in front of the moving first vane 56 to move through the first passage 36.

A second rotor 66 is positioned in the third compartment 22 of the cavity 14, and is fixedly mounted on the drive shaft 46 such that the second rotor rotates with the drive shaft and the first rotor 48. The second rotor 66 has an outer perimeter 68, and may be substantially circular in shape. A second slot 70 may extend radially inward from the outer perimeter 68 of the second rotor towards a center of the second rotor and the central axis of the cavity. A substantially annular second chamber 72 is defined between the outer perimeter 68 of the second rotor and the perimeter wall assembly 24. The second chamber 72 forms an ignition/exhaust compartment in which the charge of air is mixed with fuel, ignited, and then exhausted from the second chamber and the cavity in the housing.

A transfer groove 74 may be formed in the second rotor 66 for permitting the transfer of air from the second passage 38 to the second chamber 72. The second rotor 66 overlaps and blocks movement of air through the second passage 38 through a large portion of the rotation of the second rotor, and the transfer groove may register or align with the second passage at one point in the rotation of the second rotor, at which point compressed air being held in the second compartment is permitted to move through the second passage and the transfer groove into the second chamber 72. The transfer groove 74 may extend from a side of the second rotor 66 to the outer perimeter 68 of the second rotor, and may extend radially along an axis radiating outwardly from the central axis 15. The transfer groove 74 may have a guide surface 76 oriented substantially opposite to the second passage 38 for guiding air moving from the second passage to the second chamber, and the guide surface may have an arcuate contour for facilitating such movement.

A second vane 78 is mounted in the second slot 70 of the second rotor, and may be movable in a radial direction with respect to the second rotor such that the second vane is extendable beyond the outer perimeter 68 of the second rotor toward the perimeter wall assembly 24. Means for biasing the second vane 78 in a radially outward direction in the second slot may be provided for biasing the second vane against the perimeter wall assembly. In one embodiment of the invention, the means comprises a spring 80 positioned in the second slot 70 between the second vane 78 and the base of the second slot. Optionally, up to four or more springs may be employed for biasing the second vane outwardly. In another embodiment of the invention, the biasing of the second vane 78 is caused by a momentary blast of compressed air passing through a hole 82 in the second intermediate wall 34 and into the second slot 70. The second vane 78, as well as the first vane 56, is preferably formed of a relatively lighter weight material for minimizing the effects of inertia on the movement of the vanes for quicker response by the vane. In one embodiment of the invention, the second vane 78 may be formed of a ceramic material to increase the speed at which the second vane moves outwardly toward the perimeter wall assembly 24 to establish the space in which combustion is to occur.

The invention includes a second cam member 84 that is stationary with respect to the housing, and may be located between the second rotor 66 and the perimeter wall assembly 24 in the second chamber 72, and between the second end wall 42 and the second intermediate wall 34. The second cam member 84 has a second camming surface 86 and a second release surface 88 over which the second vane 78 in the rotating second rotor 66 passes. The second camming surface 86 presses the second vane 78 radially inward when the second rotor 66 is rotated and the second vane contacts the second camming surface. The second camming surface 86 may have an arcuate contour, and the second release surface 88 may be oriented substantially in a plane radiating from the central axis of the cavity, although other surface orientations are possible. The second cam member 84 may include a second sealing surface 90 that is positioned adjacent to the outer perimeter 68 of the second rotor for restricting air flow between the second sealing surface and the outer perimeter of the second rotor as the second rotor is rotated.

The second passage 38 in the second intermediate wall 34 is located adjacent to the second release surface 88 of the second cam member 84 for permitting air movement from the second compartment into the second chamber 72 adjacent to the second release surface.

An exhaust outlet 92 is formed in the housing 12 for permitting the exhaust of gasses from the second chamber 72. As the second rotor 66 is rotated by the pressure of the igniting fuel/air mixture behind the second vane 78, the advancing vane 78 pushes the exhaust gases from the previous combustion through the exhaust outlet 92. Preferably, the exhaust outlet 92 extends through the second camming surface 86 of the second cam member 84, so that the exhaust outlet is in line with the path of the advancing exhaust gasses moving though the second chamber 72, and so the second vane 78 passes over the exhaust outlet.

Fuel injecting means may also be provided for injecting fuel directly into the second chamber 72. The fuel injecting means may be located closely adjacent to the second release surface 88 of the second cam member 84, which is close to the location of the second chamber where the compressed air from the second compartment 20 enters the second chamber through the transfer groove 74 when it is aligned with the second passage 38. The fuel injecting means may comprise a fuel injector 94.

Igniting means may be provided for igniting the fuel/air mixture in the second chamber 72. The igniting means is mounted on the housing 12, and may be located adjacent to the second release surface 88 of the second cam member 84. The fuel injecting means may be mounted in third annular wall 30 of the housing 12, and may be located between the igniting means and the second cam member 84. The igniting means may comprise a spark plug 96 in communication with the second chamber.

The components of the housing, including the annular walls 26, 28, 30, the intermediate walls 32, 34, and the end walls 40, 42, may be assembled in any suitable fashion, and in one embodiment of the invention these parts are held together in a clamped condition by releasable fasteners 98 extending between the end walls 40, 42. Other manners of forming portions of the housing, including casting some parts as a single unit, may also be employed.

In operation, as the first rotor rotates in a relatively clockwise direction away from the first camming member, suction is created in the first chamber that sucks a charge of air through the inlet opening and into the first chamber. As the first rotor continues to rotate, the first vane reaches the first camming surface of the first cam member, and is pushed into the first slot of the first rotor. The first cam member releases the first vane as the first vane passes the first release surface, and the first vane moves outwardly into the first chamber toward the perimeter wall assembly and against the first annular wall to create a seal with the first annular wall and the first end wall and the first intermediate wall. The charge of air sucked into the first chamber is now in front of or ahead of the advancing first vane. As the rotation of the first rotor continues, the charge of air is compressed and is pushed out of the first, or compression, chamber through the check valve and into the second, or compressed air holding, compartment. The air is held in the second compartment, and prevented from returning into the first chamber, until the air is allowed to enter the second chamber in the third compartment. The compressed charge of air is prevented from entering the third compartment until the transfer groove of the second rotor aligns or registers with the second passage.

In some embodiments of the invention, just prior to the alignment of the transfer groove with the second passage, the hole in the second intermediate wall aligns with an inner portion of the second slot in the second rotor, permitting a portion of the compressed air held in the second compartment to move through the hole into the second slot to drive the second vane outwardly into the third chamber and against the third annular wall of the housing. This alignment of the hole and the second slot occurs, in terms of the rotation of the second rotor, just after the second slot has rotated past the second cam member and the second vane has been pushed into the second slot by the second camming surface of the second cam member. In other embodiments of the invention, the biasing spring moves the second vane outwardly and no air is employed to cause the biasing of the vane.

As the second vane passes the second cam member and begins to rotate away from the cam member, a space is opened up behind the second vane. The transfer groove aligns with the second passage as the second vane moves away from the second cam member which permits the compressed air in the second compartment to enter the second chamber. At approximately the same time as the compressed air from the second compartment moves through the transfer groove into the second chamber, fuel from the fuel injector is sprayed into the space behind the second vane. With further rotation of the second rotor, the transfer groove passes the second passage and the flow of compressed air into the third chamber is stopped. The spark plug is fired, which ignites the mixture of fuel and air in the space behind the second vane. The high pressure created by the burning of the fuel and air mixture acts against the second vane, which in turn exerts a turning force on the second rotor as the burning mixture expands in the second chamber. As the second vane passes the exhaust outlet, moves over the second camming surface of the second cam member, and then is returned to the radially extended position against the third annular wall, the exhausted or burned gases of the mixture are pushed ahead of the second vane toward the exhaust outlet in a progressively shrinking space in the third chamber.

Preferably, the movement of air from the first chamber to the second compartment is allowed before the movement of air is allowed between the second compartment and the second chamber, although the volume of compressed air held in the second compartment generally exceeds the volume of the space in the second chamber to be filled while the transfer groove is aligned with the second passage. It will be appreciated that the volume of the second compartment exceeds the ability of the second chamber to accept the compressed air, and thus air accumulates and becomes further compressed in the second compartment.

Figure 6:
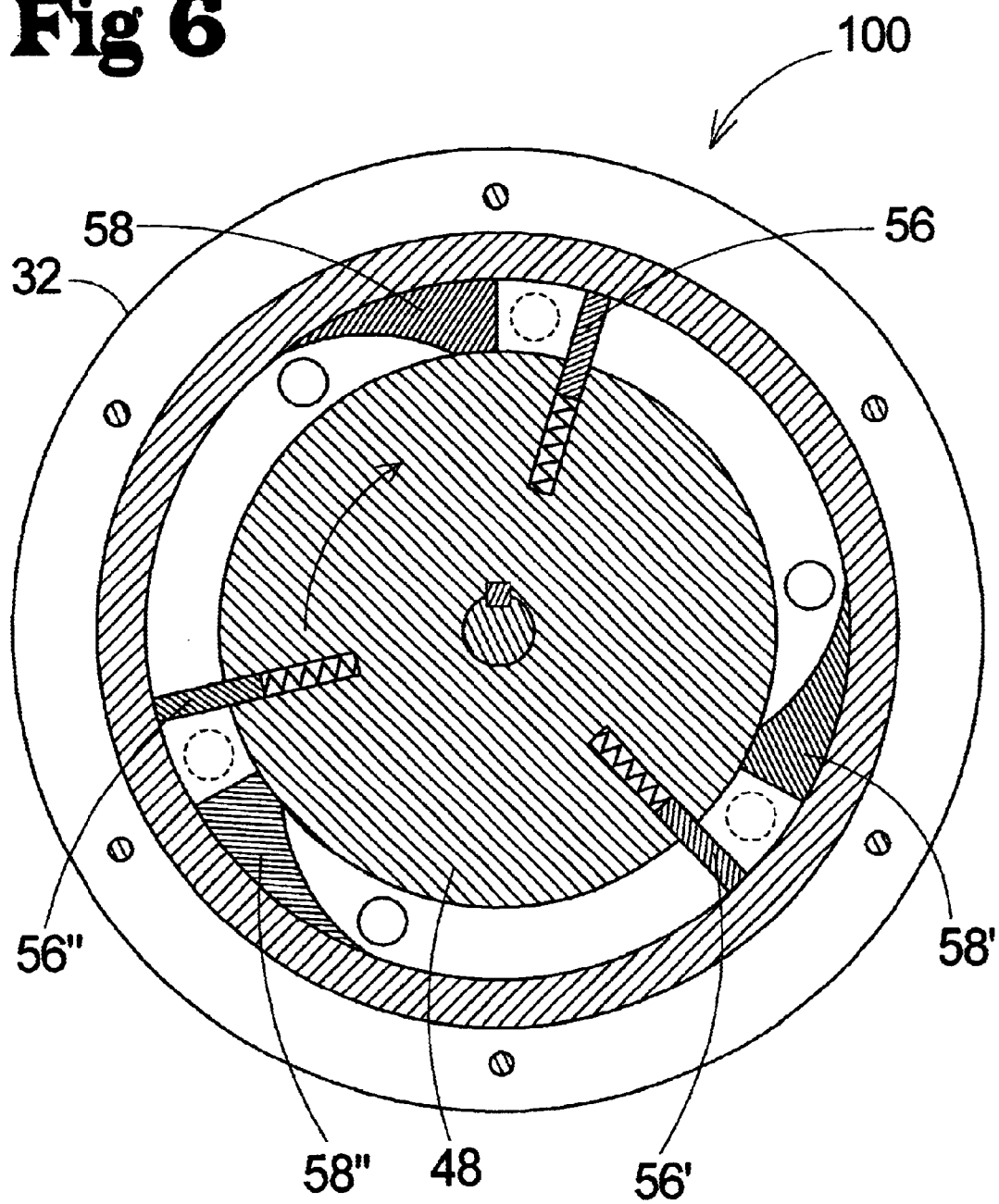
FIG. 6 is a schematic cross sectional view of an optional structure of the present invention in which three phases are performed for each revolution of the rotor. The section is taken along a lateral plane generally corresponding to line 2—2 of FIG. 1.
Figure 7:
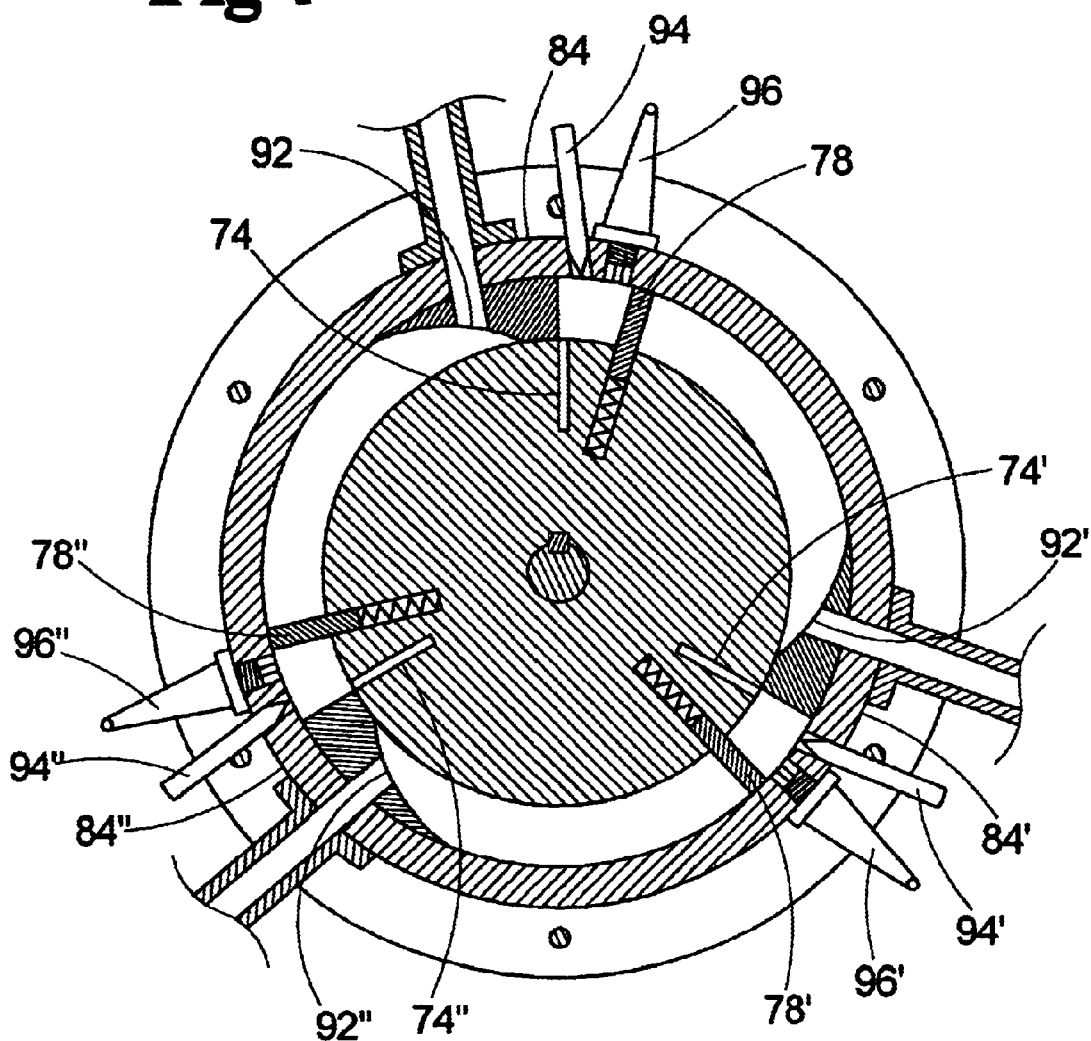
FIG. 7 is a schematic cross sectional view of the optional structure of FIG. 6 taken along a lateral plane generally corresponding to line 4—4 of FIG. 1.

In one optional embodiment of the invention, the engine may operate in multiple phases such that each rotation of the drive shaft and the rotors is accompanied by more than one compression and combustion phases. In one optional embodiment of the rotary engine 100, three phases are performed for each rotation of the drive shaft and rotors. As shown in FIG. 6, the induction and compression performed by the first rotor in the first compartment may be performed by three assemblies simultaneously. In addition to the first rotor 48, the first vane 56, and the first cam member 58 of the rotary engine 10 previously described, the engine 100 includes two additional vanes 56' and 56", and two additional cam members 58' and 58" at approximately equal radial spacings about the first rotor and the first chamber 54. Somewhat similarly, as shown in FIG. 7, the combustion and exhausting processes are performed substantially simultaneously by three assemblies. In addition to the second rotor 66, the second vane 78, the second cam member 84, the fuel injector 94, and the spark plug 96 of the rotary engine 10, the engine 100 includes tow additional vanes 78' and 78", two additional cam members 84' and 84", two additional fuel injectors 94' and 94", and two additional spark plugs 96' and 96" at approximately equal radial spacings about the second rotor and the second chamber 72. Also, additional first and second passages through the respective first and second intermediate walls are employed, as well as additional intake openings and exhaust outlets. Further, in addition to transfer groove 74, transfer grooves 74' and 74" are included. Other elements of the rotary engine 10 not specifically mentioned here may need to be duplicated as will be understood by those skilled in the art in view of the foregoing.

Figure 8:
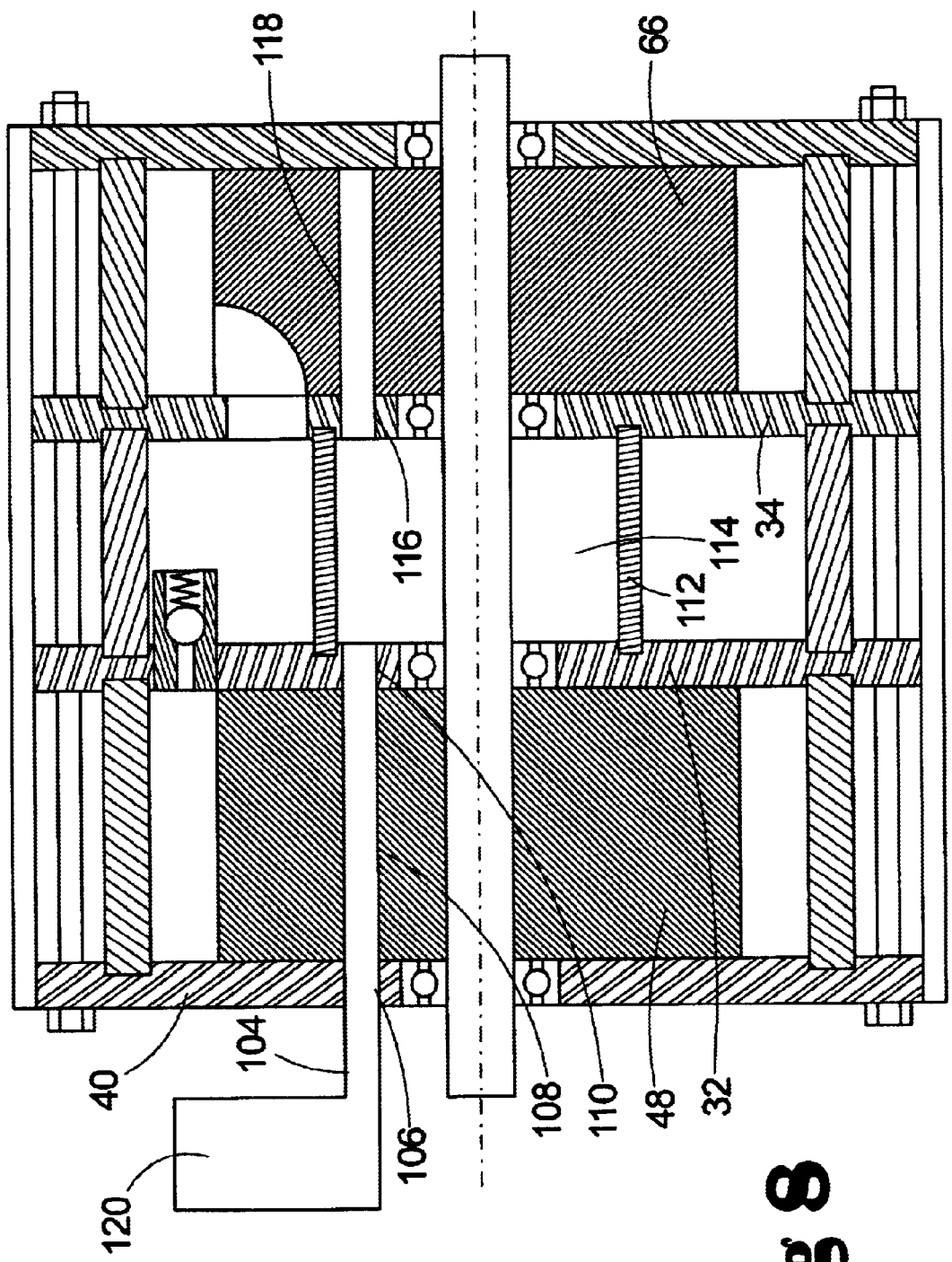
FIG. 8 is a cross sectional view of an optional variation of the present invention having a lubricating system.

One optional lubrication system for the rotary engine 10, shown schematically in FIG. 8 of the drawings, includes an oil holding tank 102 and an oil conduit 104 in fluid communication with an oil passage 106 in the first end wall 40. The oil passage 106 is intermittently in fluid communication with an oil passage 108 in the first rotor 48 as the first rotor is rotated, and the oil passage 108 in the first rotor is simultaneously in fluid communication with an oil passage 110 in the first intermediate wall which is in communication with an oil chamber 144 formed by a annular blocking wall 112 situated in the second compartment 20. The second intermediate wall 34 also has an oil passage 166 that is in communication with the interior of the oil chamber, and the oil passage 116 is intermittently in fluid communication with an oil passage 118 in the second rotor. By this structure, oil placed under pressure in the oil conduit 104 (by means not shown) is directed through the first compartment into the oil chamber 114 in the second compartment and is also moved into the third compartment. As the rotors are rotated, the oil present in the oil passages 108, 118 in the rotors is able to be exposed to the inner surfaces of the intermediate and end walls that contact the rotors for minimizing friction therebetween.

Beneficially, the rotary engine described herein provides a compressed air holding (e.g., the second) compartment that is larger than the combustion (e.g., the second) chamber.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rotary engine comprising:

a housing defining a cavity, the cavity having a central axis extending therethrough, the cavity defining a plurality of compartments, the plurality of compartments comprising first, second and third compartments being arranged along the central axis of the cavity, the housing comprising:
 a plurality of intermediate walls dividing the cavity into the compartments, the plurality of intermediate walls comprising a first intermediate wall positioned between the first and second compartments and a second intermediate wall positioned between the second and third compartments;
 a plurality of end walls defining ends of the cavity in the housing, the plurality of end walls including a first end wall positioned opposite the first intermediate wall with the first compartment therebetween and a second end wall positioned opposite the second intermediate wall with the third compartment therebetween;
 a perimeter wall assembly defining a perimeter of the cavity and the compartments;
 a first passage for permitting air to move from the first compartment to the second compartment;
 a second passage for permitting air to move from the second compartment to the third compartment;
 an intake opening for permitting air to enter the first compartment from the atmosphere; and
 an exhaust outlet for permitting exhausting of gasses from the second chamber;

a drive shaft extending in the cavity and being positioned along the central axis;

a first rotor positioned in the first compartment of the cavity, the first rotor being fixedly mounted on the drive shaft such that the first rotor rotates with the drive shaft, the first rotor having an outer perimeter, a substantially annular first chamber being defined between the outer perimeter of the first rotor and the perimeter wall assembly, the first chamber forming a suction chamber in which a charge of air is drawn into the cavity of the housing;

a first vane mounted on the first rotor, the first vane being movable in a radial direction with respect to the first rotor such that the first vane is extendable beyond the outer perimeter of the first rotor toward the perimeter wall assembly and into the first chamber;

a second rotor positioned in the third compartment of the cavity, the second rotor being fixedly mounted on the drive shaft such that the second rotor rotates with the drive shaft and first rotor, the second rotor having an outer perimeter, a substantially annular second chamber being defined between the outer perimeter of the second rotor and the perimeter wall assembly, the second chamber forming an combustion chamber in which the charge of air is mixed with fuel, ignited, and exhausted from the cavity in the housing; and a second vane mounted in the second rotor, the second vane being movable in a radial direction with respect to the second rotor such that the second vane is extendable beyond the outer perimeter of the second rotor toward the perimeter wall assembly;

wherein the second compartment is positioned between the first and third compartments and holds compressed air after leaving the first chamber and before entering the second chamber.

2. The rotary engine of claim 1 wherein a transfer groove is formed in the second rotor for permitting transfer of air from the second passage to the second chamber, the transfer groove being registered with the second passage at one point in the rotation of the second rotor to permit compressed air from the second compartment to flow through the second passage and the transfer groove into the second chamber.

3. The rotary engine of claim 2 wherein the transfer groove extends radially along an axis radiating outwardly from the central axis of the cavity.

4. The rotary engine of claim 1 additionally comprising a first cam member located between the first rotor and the perimeter wall assembly in the first chamber, the first cam member being located between the first end wall and the first intermediate wall, the first cam member having a first camming surface and a first release surface, the first camming surface pressing the first vane radially inward when the first rotor is rotated and the first vane contacts the first camming surface.

5. The rotary engine of claim 4 wherein the first camming surface has an arcuate contour, and wherein the first release surface is oriented substantially in a plane radiating from the central axis.

6. The rotary engine of claim 4 wherein the intake opening in the first end wall is located adjacent to the first release surface of the first cam member.

7. The rotary engine of claim 4 wherein the first passage in the first intermediate wall is located adjacent to the first camming surface of the first cam member.

8. The rotary engine of claim 1 additionally comprising a second cam member located between the second rotor and the perimeter wall assembly in the second chamber, the second cam member being located between the second end wall and the second intermediate wall, the second cam member having a second camming surface and a second release surface, the second camming surface pressing the second vane radially inward when the second rotor is rotated and the second vane contacts the second camming surface.

9. The rotary engine of claim 8 wherein the second camming surface has an arcuate contour, and wherein the second release surface is oriented substantially in a plane radiating from the central axis.

10. The rotary engine of claim 8 wherein the second passage in the second intermediate wall is located adjacent to the second release surface of the second cam member for permitting air movement into the second chamber adjacent to the second release surface of the second cam member.

11. The rotary engine of claim 8 wherein the exhaust outlet extends through the second camming surface in the second cam member.

12. The rotary engine of claim 1 wherein the outer perimeters of the first rotor and the second rotors are substantially circular.

13. The rotary engine of claim 1 wherein the first rotor has a first slot extending radially inward from the outer perimeter of the first rotor towards the central axis, the first vane being positioned in the first slot, the second rotor having a second slot extending radially inward from the outer perimeter of the second rotor towards the central axis.

14. The rotary engine of claim 1 additionally comprising biasing means biasing the second vane radially outward from the first rotor for biasing the first vane against the perimeter wall assembly.

15. A three stage, four cycle rotary engine comprising:
a housing defining a cavity, the cavity having a central axis extending therethrough,
wherein the cavity defines a plurality of compartments, the plurality of compartments comprising first, second and third compartments being arranged along the central axis of the cavity;
wherein the housing includes a perimeter wall assembly defining a perimeter of the cavity formed by the housing, the perimeter wall assembly comprising at least one substantially annular wall,
wherein the perimeter wall assembly comprises three annular walls, a first one of the annular walls comprising a first compartment perimeter wall surrounding the first compartment, a second one of the annular walls comprising a second compartment perimeter wall surrounding the second compartment, and a third one of the annular walls comprising a third compartment perimeter wall surrounding the third compartment;
wherein the housing includes a plurality of intermediate walls dividing the cavity into the compartments, the plurality of intermediate walls comprising a first intermediate wall positioned between the first and second compartments and a second intermediate wall positioned between the second and third compartments;
wherein the housing has a first passage for permitting air to move from the first compartment to the second compartment, the first passage extending through the first intermediate wall;
wherein the housing has a second passage for permitting air to move from the second compartment to the third compartment, the second passage extending through the second intermediate wall, the second passage being elongate and extending along a radially axis extending from the drive shaft;
wherein the housing includes a plurality of end walls defining ends of the cavity in the housing, the plurality of end walls including a first end wall positioned opposite the first intermediate wall with the first compartment therebetween and a second end wall positioned opposite the second intermediate wall with the third compartment therebetween;
wherein the housing includes an intake opening formed therein for permitting air to enter the first compartment from the atmosphere, the intake opening extending through the first end wall;
a drive shaft extending in the cavity and being positioned along the central axis, the drive shaft extending through the first and second intermediate walls and the first and second end walls, a bearing mounting the drive shaft in each of the first and second intermediate walls and the first and second end walls,
a first rotor positioned in the first compartment of the cavity, the first rotor being fixedly mounted on the drive shaft such that the first rotor rotates with the drive shaft, the first rotor having an outer perimeter, the outer perimeter being substantially circular, a first slot extending radially inward from the outer perimeter towards a center of the first rotor, a substantially annular first chamber being defined between the outer perimeter of the first rotor and the perimeter wall assembly, the first chamber forming a suction/compression chamber in which a charge of air is drawn into the first chamber and compressed;
a first vane mounted in the first slot of the first rotor, the first vane being movable in a radial direction with respect to the first rotor such that the first vane is extendable beyond the outer perimeter of the first rotor toward the perimeter wall assembly and into the first chamber, biasing means biasing the first vane radially outward in the first slot for biasing the first vane against the perimeter wall assembly;
wherein the second compartment comprises a holding chamber in which the compressed charge of air is temporarily held before entering the third compartment;
a second rotor positioned in the third compartment of the cavity, the second rotor being fixedly mounted on the drive shaft such that the second rotor rotates with the drive shaft and first rotor, the second rotor having an outer perimeter, the outer perimeter of the second rotor being substantially circular, a second slot extending radially inward from the outer perimeter of the second rotor towards a center of the second rotor, a substantially annular second chamber being defined between the outer perimeter of the second rotor and the perimeter wall assembly, the second chamber forming a combustion chamber in which the charge of air is mixed with fuel and ignited and exhausted from the second chamber and the cavity in the housing;
a first cam member located between the first rotor and the perimeter wall assembly in the first chamber, the first cam member being located between the first end wall and the first intermediate wall, the first cam member having a first camming surface and a first release surface, the first camming surface pressing the first vane radially inward when the first rotor is rotated and the first vane contacts the first camming surface, the first camming surface having an arcuate contour, the first release surface being oriented substantially in a plane radiating from the drive shaft, the first cam member including a first sealing surface positioned adjacent to the outer perimeter of the first rotor restricting air flow between the first sealing surface and the outer perimeter of the first rotor,
wherein the intake opening in the first end wall is located adjacent to the first release surface of the first cam member;
wherein the first passage in the first intermediate wall is located adjacent to the first camming surface of the first cam member;
a transfer groove formed in the second rotor for permitting transfer of air from the second passage to the second chamber, the transfer groove registering with the second passage at one point in the rotation of the second rotor, the transfer groove extending radially along an axis radiating outwardly from the drive shaft, the transfer groove having a guide surface oriented opposite the second passage for guiding air moving from the second passage to the second chamber, the guide surface having an arcuate contour;
a second vane mounted in the second slot of the second rotor, the second vane being movable in a radial direction with respect to the second rotor such that the second vane is extendable beyond the outer perimeter of the second rotor toward the perimeter wall assembly, biasing means biasing the second vane radially outward in the second slot for biasing the second vane against the perimeter wall assembly;
a second cam member located between the second rotor and the perimeter wall assembly in the second chamber, the second cam member being located between the second end wall and the second intermediate wall, the second cam member having a second camming surface and a second release surface, the second camming surface pressing the second vane radially inward when the second rotor is rotated and the second vane contacts the second camming surface, the second camming surface having an arcuate contour, the second release surface being oriented substantially in a plane radiating from the drive shaft, the second cam member including a second sealing surface positioned adjacent to the outer perimeter of the second rotor restricting air flow between the second sealing surface and the outer perimeter of the second rotor, wherein the second passage in the second intermediate wall is located adjacent to the second release surface of the second cam member for permitting air movement into the second chamber adjacent to the second release surface of the second cam member;

an exhaust outlet being formed in the housing for permitting exhausting of gasses from the second chamber, the exhaust outlet extending through the second camming surface in the second cam member;

fuel injecting means for injecting fuel into the second chamber, the fuel injecting means being located adjacent to the second release surface of the second cam member, the fuel injecting means comprising a fuel injector; and igniting means mounted on the housing for igniting gases in the second chamber, the igniting means being located adjacent to the second release surface of the second cam member, the fuel injecting means being located between the igniting means and the second cam member, the igniting means comprising a spark plug mounted in one of the annular walls of the housing.

* * * * *